June 17, 1969 — A. K. CHITAYAT — 3,450,480
COMPARISON VIEWER
Filed April 8, 1965 — Sheet 1 of 5

INVENTOR.
ANWAR K. CHITAYAT
BY James P. Malone

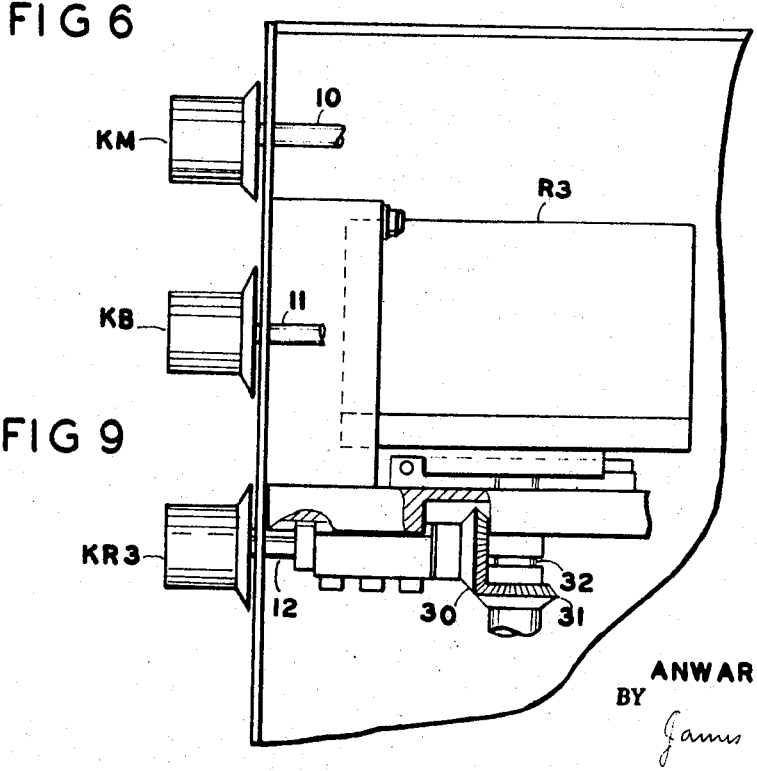

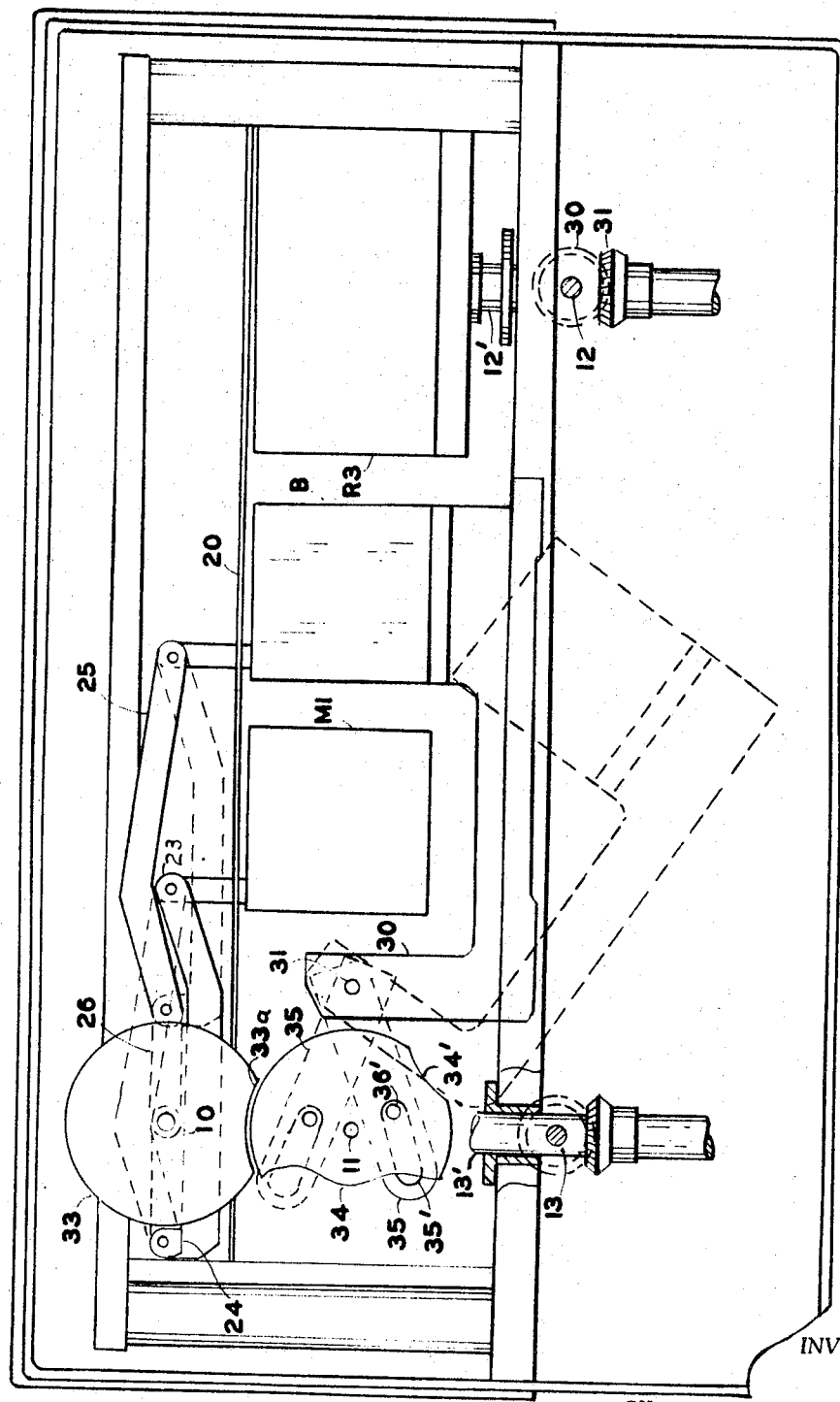

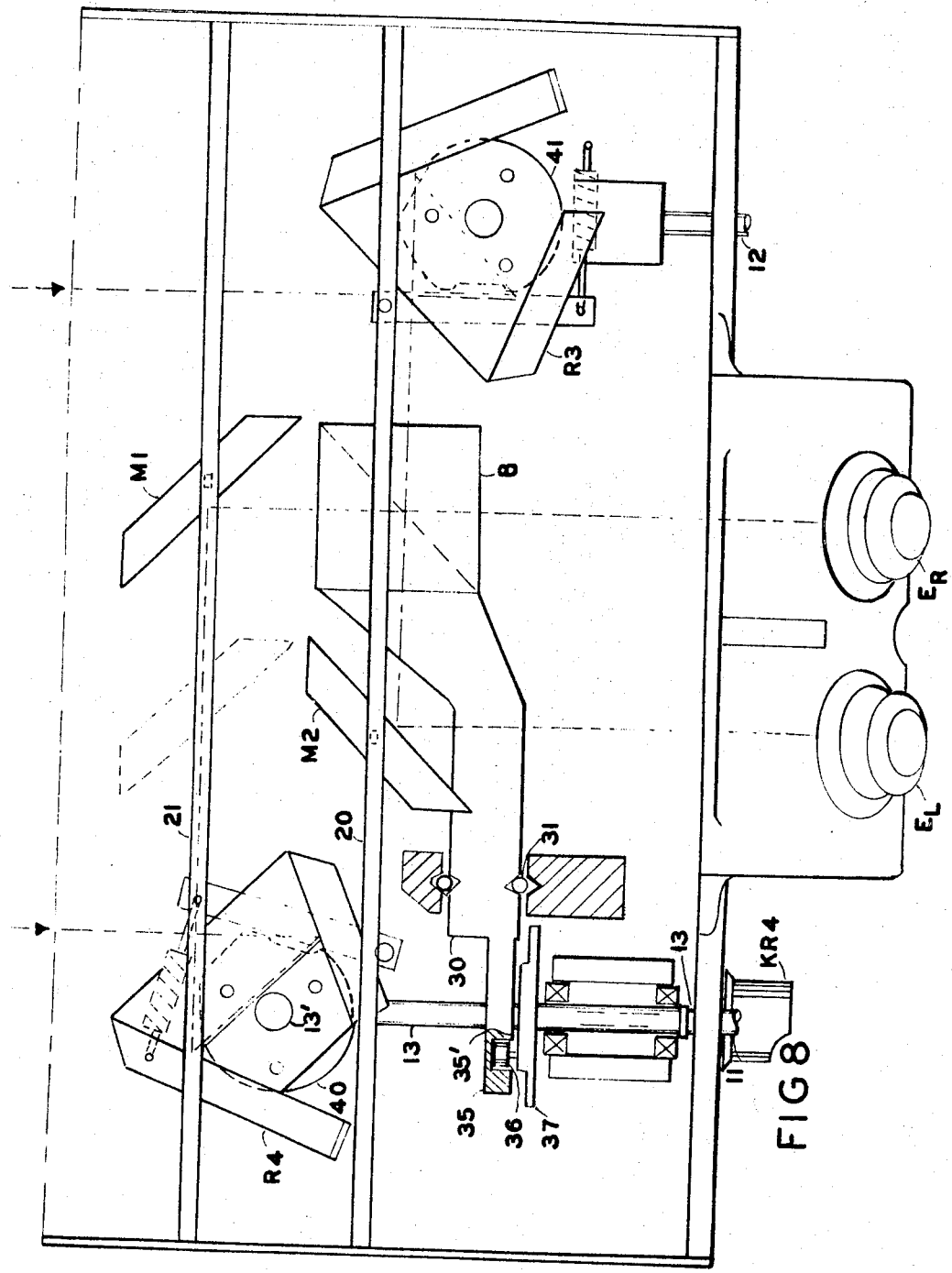

United States Patent Office 3,450,480
Patented June 17, 1969

3,450,480
COMPARISON VIEWER
Anwar K. Chitayat, Plainview, N.Y., assignor to
Optomechanisms, Inc., Plainview, N.Y.
Filed Apr. 8, 1965, Ser. No. 446,537
Int. Cl. C01b 11/00; C02b 27/24
U.S. Cl. 356—163                     1 Claim

ABSTRACT OF THE DISCLOSURE

A comparison viewer which is adapted to provide a plurality of modes of viewing, for instance, stereo viewing, pseudo (reversed) stereo viewing, superimposed left and right views, means to provide the left and right pickup views to both eyes of the operator (binocular monoscopic mode) and means to reverse the image from one or both pickups.

---

This invention relates to comparison viewing means having plural viewing modes in a device of the type having left and right viewing means.

In photo interpretation work, for instance, in evaluating aerial photographs, it is desirable that the operator be able to view and compare the pictures in several viewing modes. In a typical photo interpretation viewing device, there is a binocular eyepiece for the operator and left and right pickup means which may comprise fiber optic cable pickups which are adapted to travel over the film.

In the present invention, in order to provide the different modes of viewing, the fiber optic cables are connected to a comparison viewer which is adapted to provide a plurality of modes of viewing for instance, stereo viewing, pseudo (reversed) stereo viewing, superimposed left and right views, means to provide the left and right pickup views to both eyes of the operator (binocular monoscopic mode) and means to reverse the image from one or both pickups.

The invention generally comprises means to view left and right views received from left and right pickups and a pair of 45° mirrors which are adapted to move into first and second positions, a pair of rotatably mounted penta reflectors, means to rotate the reflectors into predetermined positions, a pivotally mounted beam splitter, and interlocking control means connected to said beam splitter and said mirrors.

More specifically, there is one control for both mirrors which slide horizontally back and forth into normal and reverse positions. A second control is provided for the beam splitter which is pivotally mounted to swing out of the way during certain modes of operation. The beam splitter control is interlocked with the mirror control to prevent mechanical interference. Each rotatable reflector has its own control which has normal, off and reversion positions.

Accordingly, a principal object of the invention is to provide new and improved comparison viewing means.

Another object of the invention is to provide new and improved photo interpretation means.

Another object of the invention is to provide new and improved comparison viewing means having a plurality of viewing modes for use in a photo interpretation viewing device.

Another object of the invention is to provide comparison veiwing means for a device having left and right viewing pickup means and a binocular eyepiece comprising means to provide stereo viewing, means to provide pseudo stereo viewing, means to provide superimposed left and right views, means to provide the left pickup view to both eyes of the operator, means to provide the right pickup view to both eyes of the operator, and means to reverse the image.

Another object of the invention is to provide new and improved comparison viewing means for a device having left and right viewing means and a binocular eyepiece comprising means to provide stereo viewing, reversed stereo viewing and superimposed left and right views, comprising a pair of 45° mirrors, means to move said mirrors into first and second positions, a pair of rotatably mounted reflectors, means to rotate said reflectors into predetermined positions, a pivotally mounted beam splitter, and interlocking control means connected to said beam splitter and said mirrors.

These and other objects of the invention will be apparent from the following specification and drawings of which:

FIGURE 6 is a diagram illustrating the control knob positions for the various modes of viewing.

FIGURE 7 is a front view of an embodiment of the invention with the cover removed.

FIGURE 8 is a top view of the embodiment of FIGURE 7 with the top removed.

FIGURE 9 is a side view of FIGURE 7 with the side removed.

Referring to the figures, the eyepiece assembly includes the optics and index switches required for the systems viewing modes. Special relay lenses $L_1$ and $L_2$, collimate the light and hence the left and right images from the fiber cables or other inputs. Parallel light is then provided at the optical mirror index, so that no focusing is required, as the optical index switches are actuated.

The mirrors M1 and M2 are linked together by a single control knob KM and slidably change positions in front of the left and right eyepieces $E_L$ and $E_R$ and relay lenses L3 and L4. They are off-set in the horizontal plane so that there is no mechanical interference between them. The mirrors M1 and M2 maintain their 45° orientation at all times.

The penta reflectors R3 and R4 are rotatably mounted. The reflectors each have a separate control knob KR3 and KR4. The beam splitter B is pivotally mounted so that when it is not in use, it drops below the horizontal plane of the eyepiece and relay lenses. The beam splitter has a separate knob KB which is interlocked with the control knob KM for mirrors M1 and M2 so that there will be no mechanical interference between the beam splitter B and mirror M2 which operates in the same vertical plane.

Mode 1—Superimposition

Figure 1:
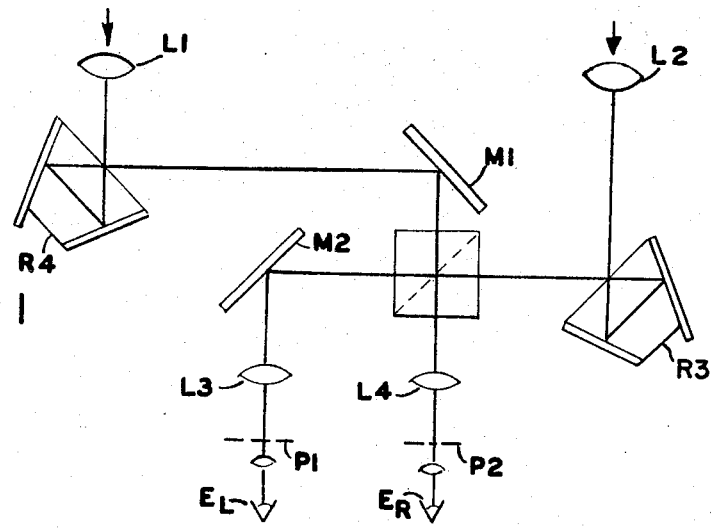
FIGURE 1 is a schematic diagram illustrating the superimposed viewing modes of viewing.

Referring to FIGURES 1 and 6 superimposed viewing permits the operator to superimpose imagery from two different film sources for purpose of comparison and scale matching. The superimposed optical schematic illustrates the configuration of the optics in the superposition mode. Here, mirrors and the beam splitter B are introduced in the optical path so that each eyepiece observes the superimposed images of the right and left cables. Thus, the illumination from the left input is first collimated by L1, which is then reflected by reflector R4 onto the reflecting mirror M1, thence to the beam splitter B cube to the right viewing channel through L4 to image plane P2; this image is also reflected by the beam splitter to the mirror M2, hence to the left channel through lens L3 to image plane P1.

The illumination from the right input is collimated by L2 and reflected by mirror R3 to the same beam splitter B and image plane P2 such that the light is reflected to the right viewing channel through L4 and image plane P2 and also passes through the beam splitter to the mirror M2 where it is reflected to the left viewing channel and through lens L3 to image plane P1. Hence, the collimated light from the left and right cables is focused onto the image planes P1 and P2 for simultaneous viewing of superimposed photo data.

*Mode 2—Single channel binocular-monoscopic viewing*

Figure 2:
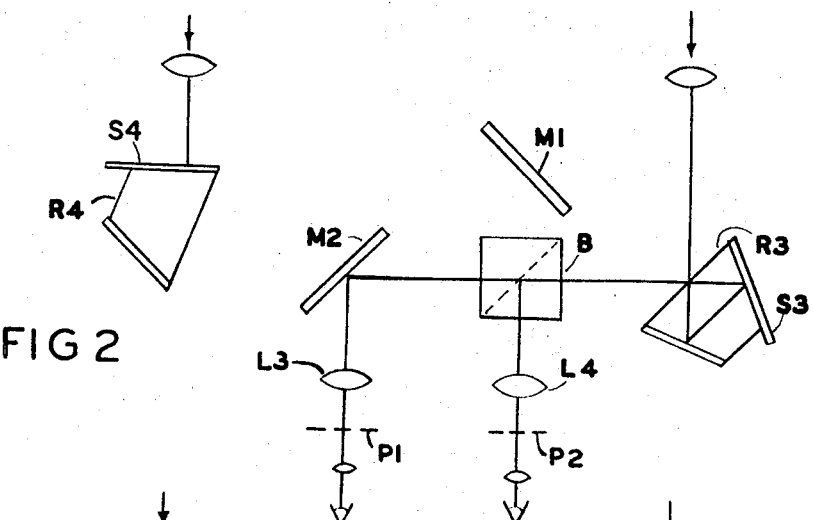
FIGURE 2 is a schematic diagram illustrating the binocular monoscopic viewing mode of viewing.

Referring to FIGURE 2, in this mode, with the aid of the beam splitter B both eyepieces observe one channel only. Here, the optics are the same as above, except a shutter S4 is introduced into the left channel by rotating R4 so that only the right channel is observed by both eyes. Alternatively, another shutter S3 is provided in the right side by rotating R3 so that only the left frame is observed by both eyepieces.

*Mode 3—Stereoscopic viewing*

Figure 3:
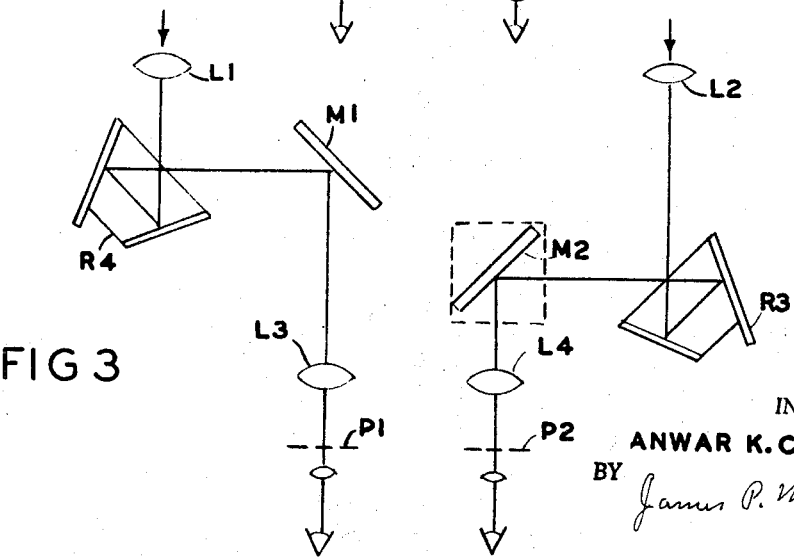
FIGURE 3 is a schematic diagram illustrating the stereo mode of viewing.

Referring to FIGURE 3 in this mode, the beam splitter B is removed and mirrors M1 and M2 are indexed in normal position as shown in optical schematic. These mirrors and beam splitter subassemblies are moved by knobs and detented into position. Penta reflectors R3 and R4 rotate about a vertical axis and beam splitter B rotates about a horizontal axis. Mirrors M1 and M2 translate into positions. In this mode, the right eye observes the right fiber cable, and the left eye observes the left cable or other input. It may be noted that the same shutters described above can be introduced into the optical path to provide monocular viewing of either channel. Shutters are in fact mirror parts of R3 and R4 that serve as shutters. They are rotated to block or reflect light so it will not enter L3 or L4.

*Mode 4—Pseude (reversed) stereo*

Figure 4:
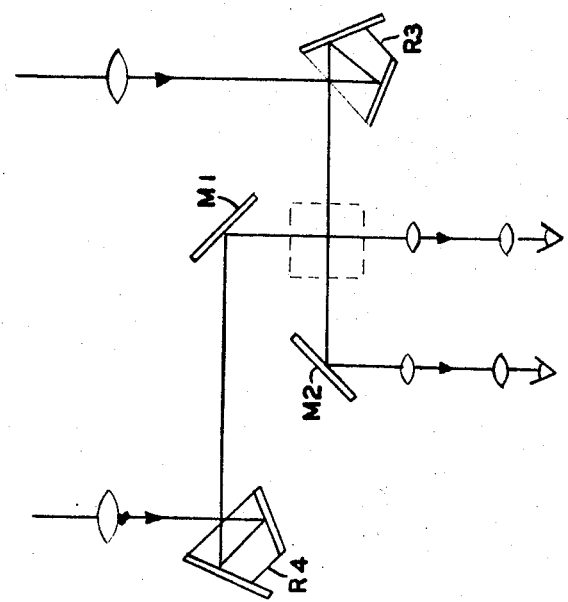
FIGURE 4 is a schematic diagram illustrating the reversed eyestation stereo (pseudostereo) mode of viewing.

Referring to FIGURE 4 in this mode, it permits the operator to see a mountain as a depression in the ground. It will also enable the operator to quickly orient imagery that has been improperly loaded on the film table; by simple translating of the eye station (mirrors M1 and M2) selector KM switch to reverse detent, when in normal stereo mode, the right eye will see the left image and the left eye the right image.

*Mode 5—Reversion*

Figure 5:
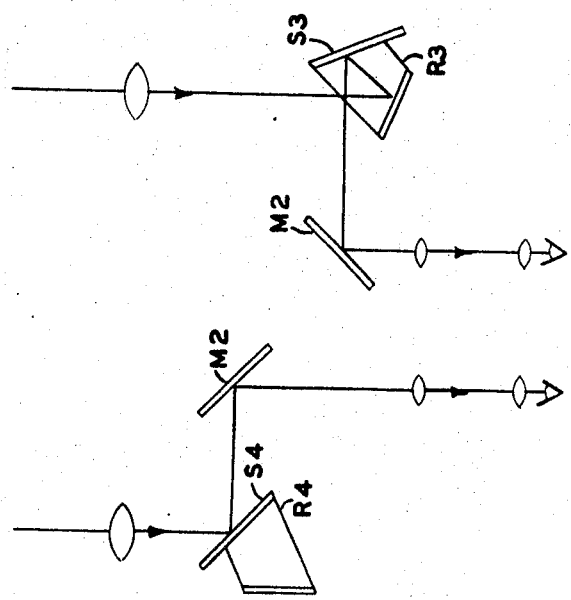
FIGURE 5 is a schematic diagram illustrating the normal stereo mode of viewing with image reversion in left channel.

Referring to FIGURE 5, this mode provides the operator with a simple, rapid means or reorienting imagery on improperly loaded spools or chips. Also, oblique photographs, left and right images, can be quickly oriented and aligned without changing spools, operator position or rotating light table. A simple reflecting mirror S4 on R4 is indexed into the optical path to provide an upright 180 degree image transformation or reversal regardless of image rotation, superposition or eyestation selection. Reversion is independent with regard to channel use or other image orientation. The right image may also be reversed by turning the mirror S3 on R3 to 45° with respect to the incoming light rays.

FIGURE 6 shows the control panel assembly set up for the various modes of operation. The knob KM (eye station) controls the two 45° mirrors M1 and M2. The knob KB controls the beam splitter. The knob KR3 controls the reflector R3 and the knob KR4 controls the reflector R4.

The knob KM has two positions, normal and reversed. The beam splitter B moved by knob KB which has two positions, stereo and superimposed. The knobs KR3 and KR4 for the reflectors have three positions, normal, off and reversion.

In the stereo mode, FIGURE 3, the knob KM is set in the normal position. The knob KB is set in the stereo position and knobs KR3 and KR4 are set in the normal position.

In the binocular monoscopic mode, FIGURE 2, in the right format, the knob KM is set in the reversed position and knob KB is set in the superimposed position and the knob KR3 in the normal position and KR4 in the off position. In the left format position, the knobs KM and KB remain the same and knob KR3 is turned to the off position and KR4 is turned to the normal position.

In the superimposed mode, FIGURE 1, the knob KM is in the reversed position, the knob KB in the superimposed position and knobs KR3 and KR4 in the normal position.

Image reversion may be obtained in any mode for instance, in FIGURE 5 in the stereo format, the knob KM is set in normal position, the knob KB is turned to stereo position, the knob KR3 is turned to normal position and knob KR4 is turned to reversed position.

In the superimposed format, the knob KM is set in the reversed position, the knob KB is set in the superimposed position, the knob KR3 is set in the normal position and KR4 is set in the reversed position. Image reversion may be obtained in this mode by changing KR3 and KR4.

In the pseudo stereo mode, FIGURE 4, the knob KM is in the reversed position, knob KB is in the stereo position, knobs KR3 and KR4 are in their normal position. Image reversion may be obtained in this mode by changing KR3 and KR4.

Referring to FIGURES 7, 8, and 9, the shaft 10 is connected to mirror knob KM. The shaft 11 is connected to the knob KB for controlling the beam splitter B. The shafts 12, 12' are connected to the reflector R3 and knob KR3 and the shafts 13, 13' are connected to the reflector R4 and knob KR4. The eyepieces $E_L$ and $E_R$ are mounted on the front of the apparatus.

The mirrors M1 and M2 slide on the tracks 21 and 20. Mirror M1 is operated by means of the linkage comprising the member 23 which is pivotally connected at one end to the mirror M2 frame and which is pivotally connected at its other end to member 24 which is fixedly connected at its other end to the shaft 10.

The mirror M1 is simultaneously moved by the linkage comprising linkage member 25 which is pivotally connected at the frame of mirror M1 and which is pivotally connected at its other end to the linkage member 26 which is fixedly connected at its other end to the shaft 10. Therefore, when the shaft 10 is rotated clockwise the mirror M1 moves to the right and mirror M2 to the left, which is the reversed position shown, FIGURES 7 and 8.

The beam splitter B is pivotally mounted to the frame at the bearing 31 by means of the member 30. The beam splitter B is moved up by rotating shaft 11 counter-clockwise to move the beam splitter up to the superimposition position. This can only be done when the mirrors M1 and M2 are in reversed position as shown in FIGURE 8.

The interlocking between the mirrors and beam splitter is as follows:

The locking cam 33 is fixedly connected to the mirror operating shaft 10 and has a semi-circular opening 33a along its surface. Cam 34 is attached to the beam splitter shaft 11 and has a similar curved indentation 34'. Therefore, the mirrors can only be moved when the indentation 34' is at the upper position which will permit the rotation of the plate 33. In order to operate the beam splitter, the mirrors must be in the reversed position so that the locking surface 33a is at the bottom. This permits operation of the beam splitter. The beam splitter arm 30 is moved by means of the fixed arm 35 which has a slot 35' which engages the pin and roller 36 in the slot 35'. The pin 36 is mounted on a member 37 which is fixedly connected to the beam splitter shaft 11.

The right reflector knob KR3 is connected to the shaft 12 which is connected to rotate the reflector R3, FIGURE 9, by means of the bevelled gears 30 and 31. The reflector R3 is connected to the shaft 32 which is connected to the bevelled gear 31.

The reflector R4 is similarly connected to the reflector knob KR4 by means of the shaft 13 and corresponding gearing. All of the shafts have suitable stops or detents 40, 41 to locate them in the proper positions.

Therefore, the present invention provides new and improved comparison viewing means having a plurality of viewing modes.

Many modifications may be made by those who desire to practice the invention without departing from the scope thereof which is defined by the following claims.

I claim:

1. Comparison viewing means fo ra device having left and right viewing means and a binocular viewer having two eyepieces comprising:
   means to provide stereo viewing, reversed stereo viewing and superimposed left and right views, comprising first and second mirrors, mounted at 45° to the axes of said eyepices,
   means for slidably mounting said first mirror to position said first mirror in first and second alternate positions in front of either eyepiece, comprising a first track extending transverse to the axes of said eyepieces,
   means for slidably mounting said second mirror to position said second mirror in first and second alternate positions in front of either eyepiece, comprising a second track extending transverse to the axes of said eyepieces, and forwardly displaced from said first track,
   a mechanical linkage to simultaneously move said mirrors into said first and second positions alternately on said first and second tracks transverse to the axes of said eyepieces,
   said mechanical linkage comprising a first arm connected at one end to said first mirror,
   a second arm connected at one end to said second mirror,
   a rotatably mounted control member, said arms being connected to said control member,
   a first rotatably mounted penta reflector mounted to receive a left image in one position and transmit said image to one of said mirrors,
   a second rotatably mounted penta reflector mounted to receive a right image in one position and transmit said image to the other of said mirrors,
   means for rotating each of said penta reflectors to an off position to cut off transmission of said images to said mirrors.
   a pivotally mounted arm, a beam splitter mounted on said arm to receive an image from one of said reflectors in one position of said beam splitter along the travel axis of said second mirror,
   beam splitter control knob means connected to rotate said beam splitter into and out of position along said travel axis,
   interlocking control means connected to position said beam splitter and said first and second mirrors without mechanical interference, comprising a first cam connected to said beam splitter arm, and a second interlocking cam connected to said mechanical linkage for moving said mirrors.

References Cited

UNITED STATES PATENTS

| | | | |
|---|---|---|---|
| 1,085,883 | 2/1914 | Stützer | 88—2.7 |
| 1,918,527 | 7/1933 | Eppenstein | 88—2.7 |
| 1,928,662 | 10/1933 | Eppenstein | 88—2.7 |
| 2,422,033 | 6/1947 | Mihalyi | 88—2.7 |
| 2,478,442 | 8/1949 | Wittel | 88—2.6 |
| 2,960,006 | 11/1960 | Bartorelli | 350—136 |
| 3,055,261 | 9/1962 | Braun et al. | |
| 3,187,625 | 6/1965 | Howell et al. | |

FOREIGN PATENTS

| | | |
|---|---|---|
| 891,348 | 3/1962 | Great Britain. |
| 538,688 | 11/1931 | Germany. |

RONALD L. WILBERT, Primary Examiner.

J. ROTHENBERG, Assistant Examiner.

U.S. Cl. X.R,

350—137